United States Patent [19]

Leiber

[11] 4,141,595
[45] Feb. 27, 1979

[54] ANTI-WHEEL-LOCK OR ANTI-SKID SYSTEM FOR MOTOR VEHICLES

[75] Inventor: Heinz Leiber, Leimen, Fed. Rep. of Germany

[73] Assignee: Robert Bosch GmbH, Stuttgart, Fed. Rep. of Germany

[21] Appl. No.: 835,079

[22] Filed: Sep. 20, 1977

Related U.S. Application Data

[63] Continuation of Ser. No. 703,798, Jul. 9, 1976, abandoned.

[30] Foreign Application Priority Data

Jul. 15, 1975 [DE] Fed. Rep. of Germany ....... 2531525

[51] Int. Cl.² .......................... B60T 8/10; B60T 13/68
[52] U.S. Cl. ...................................... 303/10; 303/115; 303/116; 303/119; 417/416
[58] Field of Search ................... 303/6 R, 6 C, 10, 52, 303/115, 116, 119; 60/433; 417/416, 417, 443

[56] References Cited

U.S. PATENT DOCUMENTS

| | | | |
|---|---|---|---|
| 3,181,665 | 5/1965 | Trombetta | 303/10 |
| 3,729,169 | 4/1973 | MacDuff | 303/115 |
| 3,874,745 | 4/1975 | Peruglia | 303/116 |
| 3,888,547 | 6/1975 | Ron | 303/10 |

FOREIGN PATENT DOCUMENTS 2450874  5/1975  Fed. Rep. of Germany ........... 303/119

*Primary Examiner*—Trygve M. Blix
*Assistant Examiner*—Reinhard J. Eisenzopf
*Attorney, Agent, or Firm*—Edwin E. Greigg

[57] ABSTRACT

An anti-wheel-lock or anti-skid system for vehicles has a multi-position valve assembly which permits selective actuation of two different groups of brakes. In addition, the valve has provision for selective actuation of individual wheels in one of the group of brakes, for example the front wheels of the vehicle. The multi-position valve assembly has a movable member which is positioned by an electric or hydraulic drive which is controlled by switches actuated by the movable valve member, indicating that a desired position has been attained.

20 Claims, 3 Drawing Figures

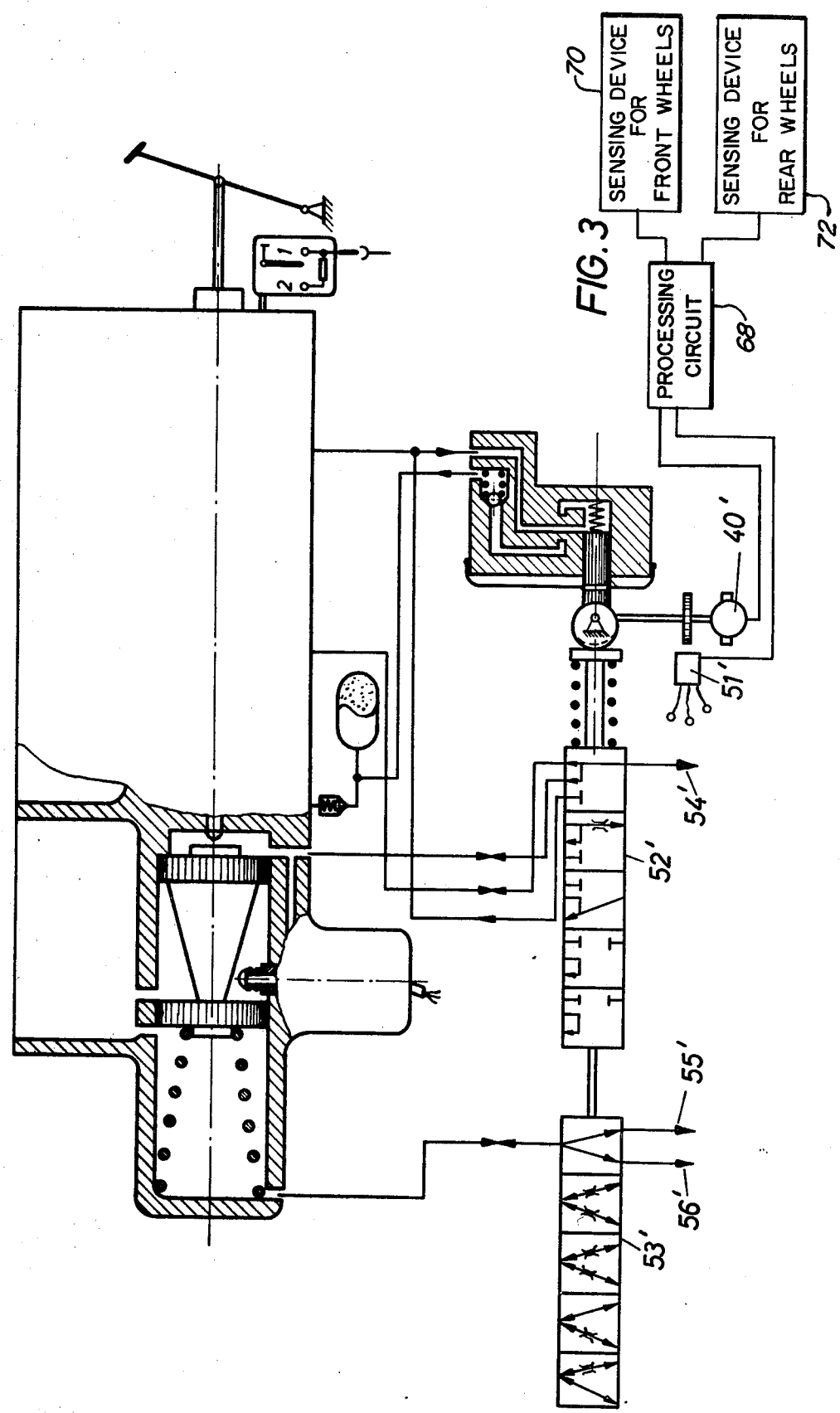

ANTI-WHEEL-LOCK OR ANTI-SKID SYSTEM FOR MOTOR VEHICLES

This is a continuation of application Ser. No. 703,798, filed July 9, 1976, and now abandoned.

BACKGROUND OF THE INVENTION

The invention relates to an anti-wheel lock control system for motor vehicles equipped with wheel sensors and a processor circuit and in which a valve assembly is used for controlling the brake pressure at some of the wheels, especially the wheels on the rear axle (first brake circuit). The control is based on sensor signals derived from the wheels and the variable brake pressure produced on the basis of the sensor signals is used for displacing the piston of a master brake cylinder which is the brake source for the second brake circuit in the vehicle.

An anti-lock control system of this kind which is somewhat simpler than the customarily used anti-lock or anti-skid systems has already been proposed. According to one such proposal, the pressure of a first brake pressure generator is controlled by means of a multistage valve and this control pressure serves as the brake pressure, for example for the rear wheels. That brake pressure or some brake pressure which is further influenced by other wheel lock signals coming, for example from the front wheels, is then used as the control pressure for the piston of the second main brake cylinder whose output is coupled to the other brake circuit which preferably includes the front wheels of the vehicle.

OBJECT AND SUMMARY OF THE INVENTION

It is a principal object of the invention to improve the above-described proposed control system in such a manner that the pressure conditions at the brakes of the wheels in the second brake circuit, especially those of the steered wheels of the vehicle, may be controlled, at least partially, independently.

This object is attained according to the invention by providing that the lines leading to the other wheels of the vehicle include supplementary valves for changing the brake pressure and that these valves are controlled by sensor signals from the associated wheels and permit at least a separate and independent pressure decay at the two brakes in the second circuit.

Instead of placing the brakes of the rear wheels into the first circuit and those of the front wheels into the other circuit it would also be possible to embody a diagonal brake circuit separation or to include two axles of utility vehicles into the second circuit.

The supplementary valves required in the control system according to the invention may be combined into a multi-position valve in which each individual position is associated with different combinations of pressure gradients for the individual wheel brakes.

The valves used for the control of the brake pressure may be sliding valves or seat valves. According to a preferred embodiment, in which seat valves are used, these are so embodied that, without external influence, they permit a pressure increase but no pressure decrease at the brakes. However, depending on the ratio of pressures of the two pressure sources, they may be lifted from their valve seats, namely when the pressure of the pressure source in the second circuit has attained a predetermined relation to the pressure of the source of the first circuit. When the anti-lock control is operative and if the first brake circuit includes the rear wheels, the pressure of the first brake circuit generator is always substantially greater than the control pressure so that these valves will no longer be held open, but when the two pressures are substantially equal, the valves are definitely kept open. The pressure release at the individual brakes takes place by separate lift-off of the valve closure members from their seats. In order to avoid a pressure decrease in the partial circuit of the first open valve when the closure member of the other valve is lifted, the first closure member is provided with a second valve seat onto which it attaches and thus closes the first partial circuit. The opening of the valves is effected by a movable valve element which assumes two positions for causing the above-described valve opening in addition to its initial position. This valve element can be driven electromagnetically, hydraulically or pneumatically.

When a slide valve is employed as the multiple position valve, it is unnecessary to keep the valves open separately and to release them by a supplementary valve position.

Preferably, however, the valves for varying the pressure in the rear axle brake circuit and the pressure in the control chamber of the main brake cylinder, as well as the valves associated with the wheels, including the above-mentioned multi-position valve, are portions of a multi-stage valve whose movable portion or armature may be placed in different positions by a drive mechanism. In this manner, the different positions of the valve are associated with different combinations of secondary valves so that different pressure gradients are effective in the various brake circuit or partial brake circuits. It is advantageous if the multistage valve is so embodied that the pressure is changed only in one circuit or partial circuit or in a group of valves whereas, in the other circuits, the pressure is kept constant. In accordance with one possible exemplary embodiment, in one position of the armature of the multistage valve, the pressure may increase at all brakes, whereas, in a second position, an inlet valve is closed, i.e., none of the brakes receives any further pressure increase, whereas, in a third position, a supplementary outlet valve is opened, permitting the pressure decrease at the rear wheels and in the control chamber for the piston of the main brake cylinder of the second brake circuit. At the same time, due to the supplementary valves, there is no pressure decay at the front wheels. In a fourth position of the multistage valve, a valve permits the pressure decrease in the rear axle circuit, whereas opening a valve associated with the front wheels permits a pressure decrease in the appropriate front wheel brake. Finally, in a fifth position, a valve permits opening the line to one of the front wheel brakes, thus causing a pressure decrease while the other front wheel is closed by its associated valve.

The sensor signals, which are obtained by known transducers connected cyclically in known manner to a processing circuit, and which characterize the condition of all the wheels, are used to place the multistage valve in one of its control positions in which, for example, the pressure is held constant at all wheels or pressure decays are permitted at individual wheels or at all wheels and possibly also pressure increases.

The multistage valve is advantageously so embodied that, when the individual positions thereof are attained, different spring forces oppose any further motion of the valve member. Thus, the individual positions of the multistage valve may be selected by providing variable power to a solenoid which drives the movable part of the valve.

It is even more advantageous to sense the particular displacement of the armature by means, for example, of switches or electronic transducers, and to decrease the drive power of the armature when the desired position is attained. The drive power may be changed either by changing the level of the power or by controlling the solenoid with pulses. It may also be attained by shutting the control power off altogether and reapplying it after the armature has returned to a position sensed by a contact, resulting in a so-called two-point control. It would also be possible to decrease the gradient of the electric control power as a function of time when the desired position is approached. In yet another version, a drive motor carrying an eccentric cam could be used.

In a specially preferred exemplary form of the invention, the drive means of the multistage valve may be that required in any case for driving the pump and this drive may be electromagnetic, an electric motor, or hydraulic and would require that the armature of the valve can be coupled to and from the drive means.

The invention will be better understood as well as further objects and advantages thereof become more apparent from the ensuing detailed description of preferred embodiments.

BRIEF DESCRIPTION OF THE DRAWING

FIG. 3 is an exemplary embodiment of the invention employing a five stage valve embodied as a slide valve.

DESCRIPTION OF THE PREFERRED EMBODIMENTS

Figure 1:
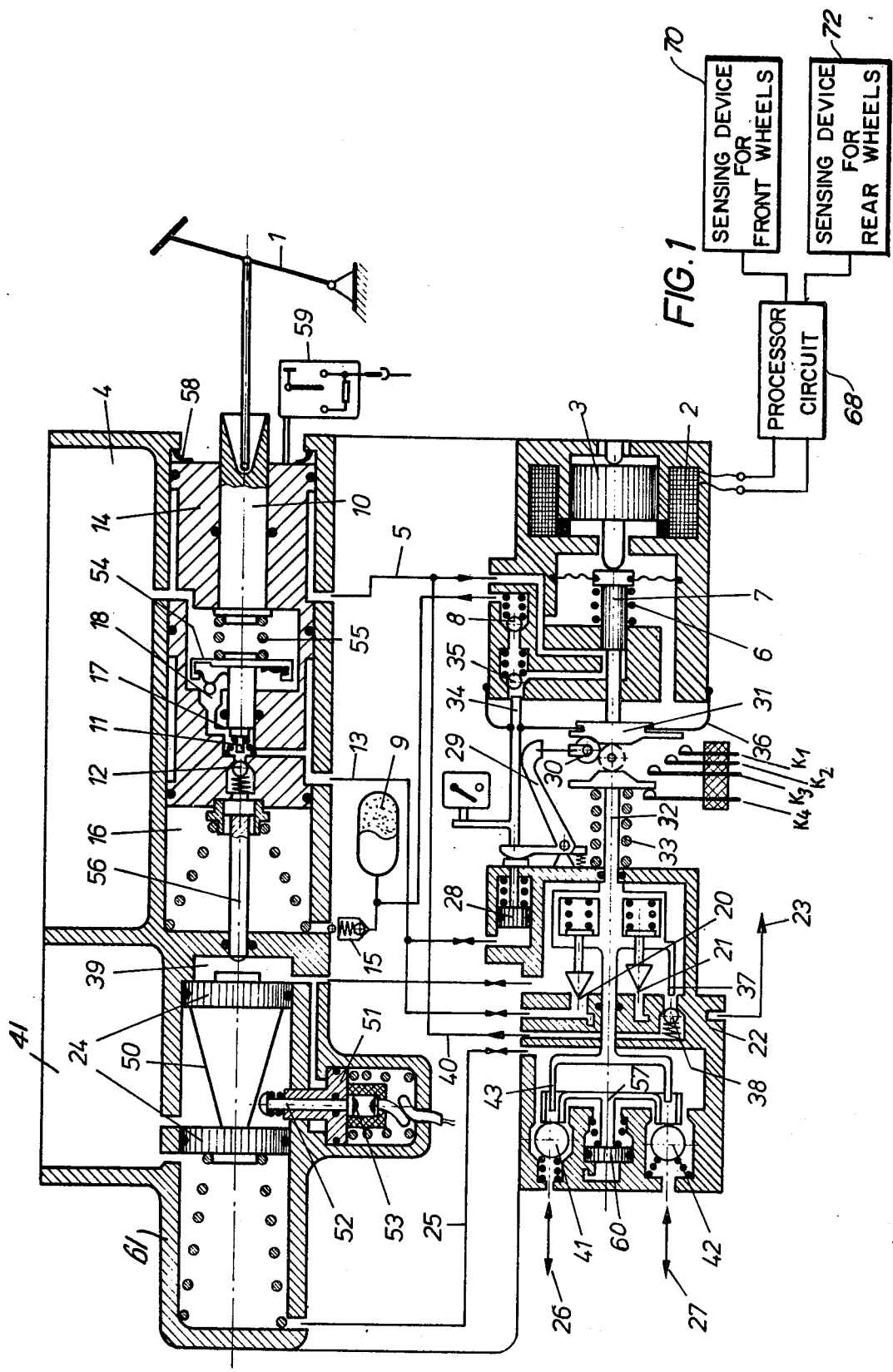
FIG. 1 is a partially sectional and partially schematic diagram of a first exemplary embodiment of the invention.

Turning now to FIG. 1, there is illustrated the first embodiment of the invention showing three major components, namely the brake pressure source for the first braking circuit including a pump and an elastic storage as well as a brake control valve. In FIG. 1 the electromagnetic pump drive includes a coil 2, an armature 3 and a spring 6. In one position of a piston 7, brake fluid flows from a reservoir 4 through a conduit 5 to the pump cylinder and is delivered by the driven pump piston 7 through a check valve 8 to an elastic storage container 9. The pump and the storage container represent the source of brake fluid pressure which is connected through a check valve 15 with a pressure chamber 16. The control piston 10 consists of two parts coupled together by means of a coupler 55 and the control piston 10 is actuated by a brake pedal 1 via suitable linkage. The motion of the control piston 10 in turn displaces a pin 11 which pushes open the brake valve 12. Thus pressure is admitted to the line 13. The same pressure acts backward onto the brake pedal via the piston 10 so that the operator receives information as to the magnitude of the applied pressure. An auxiliary piston 14 is provided as an emergency piston. In the illustrated initial position of the control piston, the line 13, and hence the first brake circuit, is connected to the reservoir 4. This connection is closed, however, by pedal actuation, firstly by the passage of a relief valve 17 and, supplementarily, by a seat valve 18. The pressure admitted to the line 13 acts, firstly, through the open valve 20 and the valve 21 of the five position valve 22, on the rear axle brake circuit which would be connected at the location 23 and it also acts, through the open valve 20, on the piston 24. The displacement of this piston causes the pressure in the second brake circuit (line 25) to be built up. The second brake circuit is divided in the five stage valve 22 into two separate partial circuits 26 and 27 which include valves for separate pressure decay and which lead to the two front wheels. Furthermore, the control pressure also determines the position of the piston 28 which, after the pressure reaches a predetermined but low value, so far displaces the lever 29 that a coupler, embodied here by way of example as a roller 30, is placed between a part 31 moved by the elements 2, 3 and 6 and a movable valve member 32. The separation between the movable part 32, forced to the right in the figure by the spring 33, and the element 31 is chosen so that, during normal pump operation, the members 31 and 32 are not in engagement and that their coupling is insured only after the roller 30 has pivoted into the intervening position shown in dotted lines. Further connected to the lever 29 is a rod 34 which opens the valve 35 after an appropriate displacement of the piston 28 and thus renders the pump ineffective due to the elastic property of the wall 36. The displacement of the armature 3 is sensed by contacts $K_1$ to $K_4$. In the illustrated initial position of the drive, the contact $K_4$ is closed. If it is desired to move into the second position in which the valve 20 will be closed, the armature 3 is moved until such time as contact $K_1$ closes and thus signals the arrival in that position in which any further build-up of brake pressure is terminated at all wheels. In the third position of the valve, brought about by the additional closing of contact $K_2$, a pin 37 has lifted a closure body 38 from its seat so that, subsequently, a control chamber 39 and the rear axle brake circuit connected at the location 23 are coupled to a return line 40 and a reduction of pressure results. Due to the presence of check valves 41 and 42, however, there is no decrease of the brake pressure at the front wheels of the vehicle. In the fourth position of the apparatus, the contact $K_3$ also closes, resulting in the closure of the valve 21 so that a pin 43 opens the valve 41, resulting in a pressure decrease in the partial circuit 26 and nowhere else. In the terminal position of the armature (not equipped with a special contact), the closure member 41 is pressed onto a second valve seat while the closure member 42 is lifted from its valve seat so that the pressure decay takes place only in the circuit 27.

As will be seen from the figure, the valves contained within the five position valve 22 are seat valves in which the closure members move against spring pressure relative to the independently movable valve member of the five position valve. The forces of the springs, together with that of the spring 33, constitutes the total spring force which acts on the armature in stepwise manner.

The closure of the individual contacts $K_1$ to $K_4$ indicates to the control circuit for the coil 2 whether the armature has reached its intended position. In that case, the power is reduced. For example, if the five-position valve is to be brought into the position which would reduce the pressure in the partial circuit 26, the control circuit supplies the full control power to the coil 2 until such time as the contact $K_3$ indicates that the intended position has been reached and a power reduction is initiated.

During normal braking, i.e., when the anti-skid system is not operative, the closure members 41 and 42 are lifted from their valve seats, as shown, by a lifting mechanism 57. That position permits both increases and decreases of the pressure. However, when the brake pressure control is initiated, the pressure in the line 13, i.e., the pressure admitted by the operator, is higher than the pressure at the outlet of the master brake cylinder, i.e., in line 25. Thus, a piston 60, whose left face is exposed to the pressure in the line 13, travels to the right in the figure and permits the spring loaded closure members to close their respective seats so that a pressure increase is possible, but a pressure decrease can take place only in definite positions of the five way valve, namely positions 4 and 5.

The illustrated exemplary embodiment, even though employing a single valve and one electromagnetic drive and hence only a single power control, permits separate pressure decrease in the rear axle circuit as well as at the individual front wheels and it also permits a common pressure increase and a common pressure maintenance at all brakes.

In order to control the second brake circuit, the piston 24 has an inclined surface 50, and a sensor pin 52, sliding within a piston 51, extends radially into the cylinder chamber. The relative position of the sensor pin 52 and the piston 51 may be altered against the force of the spring. When the pin 52 is displaced with respect to the piston 51, it actuates a contact 53 in a warning circuit. The piston is exposed to the pressure within the control chamber 39. Whenever an increase of the pressure does not result in a correspondingly greater displacement of the piston 24, due to leakage or poor ventilation, the warning contact is closed.

Figure 2:
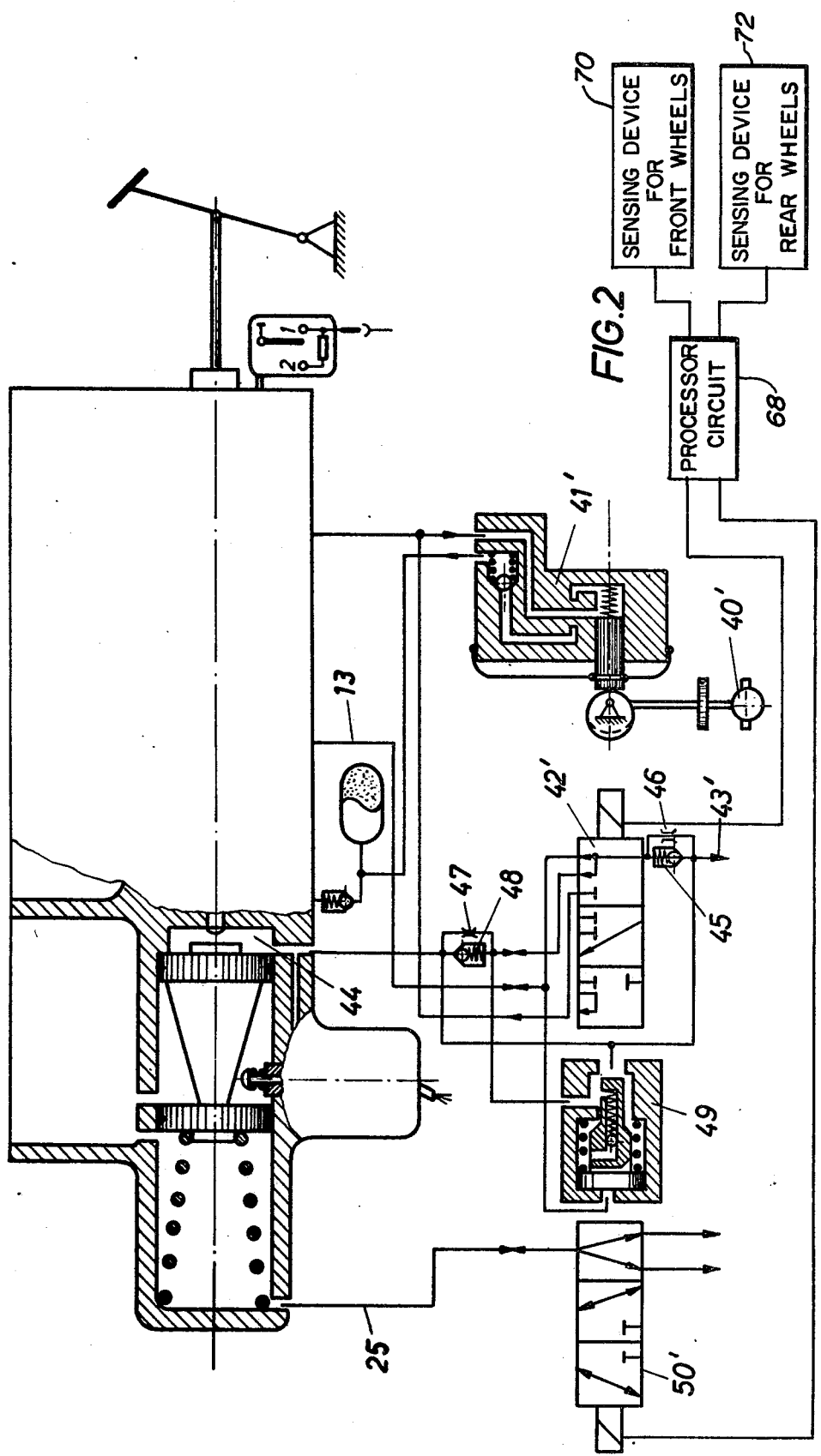
FIG. 2 is an illustration of a second exemplary embodiment of the invention showing two separately controlled valves.

The embodiment shown in FIG. 2 differs from that of FIG. 1 primarily in that separate valves are used for circuits I and II and also in that the pump 41' is driven by a motor 40'. The brake pressure generators for lines 13 and 25 are identical to those of the embodiment of FIG. 1. The pressure in line 13 is transmitted through the control valve 42' in its normal position to the first brake circuit attached at the location 43'. The first brake circuit may be, for example, the rear axle circuit and the pressure from line 13 is further transmitted to the control chamber 44 of the main brake cylinder of the second brake circuit. In both instances, the lines contain throttles 46 and 47, respectively, to obtain throttle pressure build-up with parallel check valves 45 and 48 being provided for rapid pressure decay. As long as the brake control system is not yet operating, both throttles 46 and 47 are shunted by the shunting valve 49 so that, as long as there is no tendency for the wheels to lock, the pressure build-up may take place without impedance. If the pressure at the outlet of the valve 42' falls below the pressure at its input, i.e., when the brake control is operative, the shunt valve 49 is closed and only reopens at the end of the brake cycle. In the normal position of the electromagnetically actuated control valve 50', the pressure admitted to the control chamber 44 is transmitted to the two wheel brakes connected thereto. In the second position of the valve 42', the pressure in the circuit 43' decreases and, in position 3, the pressure in the control chamber 44 decreases. By switching the valve 50' into positions 2 or 3, one obtains the pressure decrease at one of the two wheel brakes connected thereto. For example, if the rear axle circuit is connected at the location 43', the blockage signal derived from that circuit will switch the valve 42' between its two positions. If the front wheels have a tendency to block, the result is that the valve 42' will assume position 3 and the valve 50' will assume position 2 or 3, depending on which wheel tends to block. It will be seen that, when the pressure at one wheel is being reduced, the pressure at the other wheels is kept constant.

FIG. 3 illustrates a five-step valve embodied as a slide valve and driven by the pump motor. The individual valves positions are sensed by the position indicator 51'. The first position of the mechanically coupled valve members 52' and 53' corresponds entirely to the first position of the valves 42' and 50' of FIG. 2, although no throttles and no shunt valve is provided. In the second position, the pressure in the brake circuit connected at the location 54' and the brakes connected at 55' and 56' is increased in throttled manner only. In position 3, there is a rapid pressure decay in the circuit 54' and a throttled pressure increase in the partial circuits 55' and 56'. In positions 4 and 5, the pressure at the location 54' is kept constant, whereas the partial circuit 55' experiences rapid pressure decay and the partial circuit 56' experiences slow pressure decay (or constant pressure maintenance) or vice versa.

The multiple position valve shown in FIG. 3 could be implemented by yet a further position in which there would take place, for example, a common rapid pressure decrease at the wheels connected to the locations 55' and 56'.

In each embodiment the processor circuit 68 receives signals from the wheel sensor 70, 72. In addition, the processor circuit 68 of the embodiment shown in FIG. 3 receives signals from the position indicator 51'. The processor circuit 68 is connected to the coil 2 of the embodiment of FIG. 1, the valves 42', 50' of the embodiment of FIG. 2, and the motor 40' of the embodiment of FIG. 3.

For a clearer understanding of the claimed terms, the following should be noted:

For the embodiment of FIG. 1:

1. The first pressure source includes, essentially, elements 2–9.

2. The first pressure control means includes, essentially, elements 10–13, valves 20 and 21 of five position valve 22 leading to location 23, part of movable valve member 32 and elements 37 and 38.

3. The second pressure source includes, essentially, the cylinder 61 and the piston 24 displaceable within the cylinder 61, line 25 and the fluid reservoir 4' which is connected to the cylinder 61.

4. The second pressure control means includes, essentially, valves 41 and 42 of five position valve 22 leading to circuits 26 and 27, part of movable valve member 32 and elements 43, 57 and 60.

For the embodiment of FIG. 2:

1. The first pressure source includes, essentially, elements 4, 41' and 9.

2. The first pressure control means includes, essentially, the valve 42' leading to location 43'.

3. The second pressure source is similar to that of the embodiment of FIG. 1.

4. The second pressure control means includes, essentially, the valve 50'.

For the embodiment of FIG. 3:

1. The first pressure source is similar to that of the embodiment of FIG. 2.

2. The first pressure control means includes, essentially, the valve 52'.

3. The second pressure source is similar to that of the embodiments of FIGS. 1 and 2.

4. The second pressure control means includes, essentially, the valve 53'.

The foregoing relates to preferred exemplary embodiments of the invention and it will be understood that many variants and further embodiments thereof are possible within the spirit and scope of the invention, the latter being defined by the appended claims.

What is claimed is:

1. An anti-wheel lock braking system for vehicles, comprising:
   a first pressure source;
   wheel motion sensing means connected to the first pressure source, for generating signals indicative of a speed condition of the wheels, said signals being applied to the first pressure source;
   first pressure control means connected to the first pressure source, for controlling the pressure to be applied to the brakes at the rear wheels of the vehicle in accordance with the signals applied to the first pressure source;
   a second pressure source connected to the first pressure control means, said second pressure source comprising a cylinder with a piston which is acted upon by a pressure controlled by the first pressure control means in accordance with the signals applied to the first pressure source; and
   second pressure control means connected to the first and second pressure source, for individually controlling the pressure to be applied to the brakes at the front wheels of the vehicle, whereby at least a brake pressure decrease may take place separately at individual brakes of the front wheel brakes.

2. A braking system as defined by claim 1, wherein the first and second pressure control means comprise a single multi-position valve assembly the different positions of which result in different combinations of pressure gradients effective at individual wheel brakes.

3. A braking system as defined by claim 2, wherein said multi-position valve assembly includes a plurality of seat valves.

4. A braking system as defined by claim 3, wherein the multi-position valve assembly further includes means controlled by the differential pressure provided by said first and second pressure sources, and a movable valve member, wherein said plurality of seat valves include two valves constructed to permit pressure increase at the front wheel brakes wherein said means controlled by the differential pressure provided by said first and second pressure sources is disposed so as to normally open said two valves and permitting closure thereof when the brake pressure of the first pressure source is greater than the brake pressure of said second pressure source, and wherein said movable valve member is capable of occupying a first and second position, which, in said first position, opens one of said two valves and in said second position also opens the second of said two valves.

5. A braking system as defined by claim 4, wherein said one valve has a second valve seat; whereby in the second position of said movable valve member said valve is closed.

6. A braking system as defined by claim 1, further comprising external means, wherein the first and second pressure control means are part of a multistage valve assembly including a movable valve member capable of assuming different valve closure positions, said movable valve member being connected to and actuated by the external means for the generation of different pressure gradients at various parts of said braking system.

7. A braking system as defined by claim 6, wherein said multistage valve assembly includes an inlet valve, a further valve, a first valve closing member and a second valve closing member, and wherein said movable valve member of said multistage valve assembly may assume a first position permitting unimpeded pressure increase at all wheels of the vehicle; a second position in which the inlet valve is closed and a pressure increase is prevented; a third position, wherein during the transition from said second to said third position, the further valve is opened permitting decrease of the pressure of the rear wheel brakes; a fourth position, wherein during the transition from said third to said fourth position the first valve closing member is lifted from its seat; and a fifth position, wherein during the transition from said fourth to said fifth position the second closure member may be lifted from its valve seat and said first valve closing member is placed on a second valve seat.

8. A braking system as defined by claim 7 wherein said multistage valve assembly further includes a supplementary valve so disposed that during the transition from said third to said fourth position of said movable valve member, the supplementary valve interrupts the communication to the rear wheel brakes.

9. A braking system as defined by claim 6, including a plurality of spring means associated with different positions of said multistage valve assembly whereby different spring forces act upon said movable valve member in different positions thereof.

10. A braking system as defined by claim 9, wherein the first pressure source includes electric drive means, said electric drive means being connected to said movable valve member for actuation thereby, wherein the system further comprises switch means for sensing the position of said movable valve member; whereby signals are relayed to said electric drive means for changing the power applied to said movable valve member.

11. A braking system as defined by claim 10, wherein said drive means is powered by pulse trains of different character in different positions of said movable valve member.

12. A braking system as defined by claim 10, wherein the electric drive means includes electric control power means, and wherein the time gradient of the electric control power means is decreased when said movable valve member approaches a predetermined position.

13. A braking system as defined by claim 10, wherein said drive means for said movable valve member is an electromagnet.

14. A braking system as defined by claim 10, wherein said drive means is a motor with an eccentric cam including means for uncoupling said motor from said movable valve member.

15. An anti-wheel lock braking system for vehicles, comprising:
   a first pressure source;
   wheel motion sensing means associated with a first pressure control means and with a second pressure control means, for generating signals indicative of a speed condition of the wheels, said signals serving to control the first and second pressure control means;
   said first pressure control means connected to the first pressure source, for controlling the pressure to be applied to the brakes at the rear wheels of the vehicle in accordance with the signals associated with said first pressure control means;

a second pressure source connected to the first pressure control means, said second pressure source comprising a cylinder with a piston which is acted upon by a pressure controlled by the first pressure control means in accordance with the signals associated with said first pressure control means; and said second pressure control means connected to the second pressure source, for individually controlling the pressure to be applied to the brakes at the front wheels of the vehicle, whereby at least a brake pressure decrease may take place separately at individual brakes of the front wheel brakes.

16. A braking system as defined by claim 15, wherein each of the first and second pressure control means comprises a multi-position valve assembly so connected to the wheel brakes of the vehicle that different positions of the multi-position valve assemblies result in different combinations of pressure gradients effective at individual brakes.

17. A braking system as defined by claim 16, wherein the multi-position valves are sliding valves.

18. A braking system as defined by claim 17, wherein the sliding valves are mechanically coupled.

19. A braking system as defined by claim 18, further comprising a position indicator located to sense the position of the sliding valves.

20. A braking system as defined by claim 15, wherein the wheel motion sensing means is connected to the first pressure control means and to the second pressure control means, and wherein the signals generated by the wheel motion sensing means are applied to the respective pressure control means.

* * * * *